United States Patent
Sakai

(10) Patent No.: US 8,179,508 B2
(45) Date of Patent: May 15, 2012

(54) LIQUID CRYSTAL DISPLAY DEVICE HAVING FIRST AND SECOND POLARIZERS AND FIRST AND SECOND BIREFRINGENT LAYERS

(75) Inventor: Akira Sakai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 158 days.

(21) Appl. No.: 12/747,618

(22) PCT Filed: Nov. 6, 2008

(86) PCT No.: PCT/JP2008/070204
§ 371 (c)(1),
(2), (4) Date: Jun. 11, 2010

(87) PCT Pub. No.: WO2009/078227
PCT Pub. Date: Jun. 25, 2009

(65) Prior Publication Data
US 2010/0271573 A1    Oct. 28, 2010

(30) Foreign Application Priority Data
Dec. 14, 2007 (JP) .................... 2007-323936

(51) Int. Cl.
*G02F 1/1335* (2006.01)
(52) U.S. Cl. ................. 349/119; 349/96; 349/102
(58) Field of Classification Search ........... 349/96–99, 349/102–103, 117–121
See application file for complete search history.

(56) References Cited

U.S. PATENT DOCUMENTS

| | | | |
|---|---|---|---|
| 6,141,075 A | 10/2000 | Ohmuro et al. | |
| 6,285,430 B1 | 9/2001 | Saito | |
| 6,661,488 B1 | 12/2003 | Takeda et al. | |
| 7,057,689 B2 | 6/2006 | Terashita et al. | |
| 2005/0206817 A1 | 9/2005 | Kajita et al. | |
| 2006/0244884 A1 | 11/2006 | Jeon et al. | |
| 2007/0242188 A1 | 10/2007 | Sakai | |
| 2007/0279553 A1 | 12/2007 | Yoda et al. | |
| 2009/0231520 A1 | 9/2009 | Uchiyama et al. | |

FOREIGN PATENT DOCUMENTS

| | | |
|---|---|---|
| JP | 11-305217 | 11/1999 |
| JP | 2001-350022 | 12/2001 |

(Continued)

OTHER PUBLICATIONS

Supplementary EP Search Report mailed Dec. 17, 2010 in corresponding EP application No. 08862913.4.

(Continued)

*Primary Examiner* — Mark Robinson
*Assistant Examiner* — Paul Lee
(74) *Attorney, Agent, or Firm* — Nixon & Vanderhye, P.C.

(57) ABSTRACT

The present invention provides a liquid crystal display device comprising: a first polarizer; a second polarizer; a liquid crystal cell; a first birefringent layer; and a second birefringent layer, the second polarizer having an absorption axis orthogonal to an absorption axis of the first polarizer, the liquid crystal cell being disposed between the first polarizer and the second polarizer, the first birefringent layer being disposed between the first polarizer and the liquid crystal cell, satisfying $0.6 \leq Nz(550) \leq 6$, and having an in-plane slow axis orthogonal to the absorption axis of the first polarizer, the second birefringent layer being disposed between the liquid crystal cell and the second polarizer, satisfying $-5 \leq Nz(550) \leq 0.4$, and having an in-plane slow axis parallel to the absorption axis of the second polarizer, and at least one of the first and second birefringent layers satisfying $|Rxy(450)| \leq |Rxy(550)| \leq |Rxy(650)|$.

11 Claims, 5 Drawing Sheets

FOREIGN PATENT DOCUMENTS

| | | |
|---|---|---|
| JP | 2006-514754 | 5/2006 |
| JP | 2006-267625 | 10/2006 |
| JP | 2007-232873 | 9/2007 |
| JP | 2007-232874 | 9/2007 |
| WO | WO 2006/001448 | 1/2006 |
| WO | WO 2006/025474 | 3/2006 |

OTHER PUBLICATIONS

International Search Report for PCT/JP2008/070204, mailed Dec. 9, 2008.

Zhu et al., "Super Wide View In-Plane Switching LCD with Positive and Negative Uniaxial A-Films Compensation", SID 05 DIGEST, No. 28.2, (2005), pp. 1164-1167.

LIQUID CRYSTAL DISPLAY DEVICE HAVING FIRST AND SECOND POLARIZERS AND FIRST AND SECOND BIREFRINGENT LAYERS

This application is the U.S. national phase of International Application No. PCT/JP2008/070204 filed 6 Nov. 2008, which designated the U.S. and claims priority to JP Application No. 2007-323936 filed 14 Dec. 2007, the entire contents of each of which are hereby incorporated by reference.

TECHNICAL FIELD

The present invention relates to a liquid crystal display device. The present invention more specifically relates to a liquid crystal display device having a birefringent layer between a pair of polarizers disposed in the crossed Nicols state.

BACKGROUND ART

Liquid crystal display devices are widely used as display devices for various data-processing devices such as computers and televisions. In particular, TFT liquid crystal display devices (hereinafter, also referred to as "TFT-LCDs") become popular, and expansion of the TFT-LCD market is expected. Such a situation creates a demand for much improved image quality.

Although the present description employs the TFT-LCDs as an example, the present invention may be applicable to passive matrix LCDs, plasma address LCDs, and the like, in addition to the TFT-LCDs. Generally, the present invention is applicable to an LCD which contains a liquid crystal between two substrates each provided with an electrode and which displays an image when a voltage is applied between the electrodes.

The most widely used mode in the TFT-LCDs currently is a mode in which a liquid crystal having positive dielectric anisotropy is horizontally aligned between substrates opposing each other, namely, the TN mode. In a TN liquid crystal display device, the alignment direction of liquid crystal molecules adjacent to one substrate is twisted by 90° to that of liquid crystal molecules adjacent to the other substrate. Such TN liquid crystal display devices are now produced at low cost and have been industrially mature, while they are less likely to achieve a higher contrast ratio. The TN liquid crystal display device may be improved in this respect.

In addition, there are known liquid crystal display devices having another mode in which a liquid crystal having negative dielectric anisotropy is aligned perpendicular to substrates opposing each other, namely the vertical alignment (VA) liquid crystal display devices. In the VA liquid crystal display devices, liquid crystal molecules are aligned almost perpendicular to the surfaces of the substrates when no voltage is applied. Here, the liquid crystal cell hardly shows birefringence and optical rotation, and light passes through the liquid crystal cell while hardly changing in its polarization state. Thus, in the case of the arrangement such that the liquid crystal cell is interposed between two polarizers whose absorption axes are orthogonal to each other, it is possible to display an almost perfectly black screen when no voltage is applied. When a voltage is applied, the liquid crystal molecules are made to be almost parallel to the substrates, the liquid crystal cell shows large birefringence, and the liquid crystal display device displays a white screen. Thus, such a VA liquid crystal display device easily achieves a very high contrast ratio, which is not achieved by the TN liquid crystal display devices.

However, the VA liquid crystal display device is less likely to have a wide viewing angle, and the VA liquid crystal display device may be improved in this respect. This is because as follows.

When no voltage is applied, as mentioned above, the VA liquid crystal display device displays an almost perfectly black screen because the liquid crystal cell hardly shows birefringence and the two polarizers are perfectly orthogonal in the frontal direction (the direction perpendicular to the display surface), but the liquid crystal cell shows birefringence in oblique directions and apparently has phase difference. Further, the two polarizers are apparently not geometrically orthogonal. Thus, light leakage occurs to cause reduction in the contrast ratio, resulting in a narrower viewing angle.

For the above reasons, VA liquid crystal display devices are provided with retardation films in many cases in order to remove excessive retardation of the liquid crystal cell in oblique directions and to maintain orthogonality of the polarizers in a crossed Nicols state in oblique directions. For example, there are disclosed techniques for widening a viewing angle wherein polarizers are disposed on both sides of the perpendicularly aligned liquid crystal cell, and the polarizer and the liquid crystal cell sandwich at least one of the following films: a uniaxial retardation film having an in-plane optic axis and satisfying the relationship of extraordinary index>ordinary index (a positive A plate); a uniaxial retardation film having an out-of-plane (film normal direction) optic axis and satisfying the relationship of extraordinary index<ordinary index (a negative C plate); and a biaxial retardation film (see Patent Documents 1 to 3).

In addition, there are also disclosed the following techniques in which multiple retardation films are used in combination: a technique with combination use of a positive A plate and a positive C plate (see Patent Document 4); a technique with combination use of a negative A plate and a negative C plate (see Patent Document 5); and a technique with combination use of a biaxial retardation plate having birefringence with an in-plane retardation of 250 to 300 nm and an Nz of 0.1 to 0.4 and a biaxial retardation plate having birefringence with an in-plane retardation of 250 to 300 nm and an Nz of 0.6 to 1.1 (see Patent Document 6).

In addition to the VA liquid crystal display devices, there is known another liquid crystal display device wherein an electric field is transversely applied to a homogenious liquid crystal cell in which a liquid crystal is interposed between two substrates each having the surfaces subjected to treatment for homogenious alignment, and thereby liquid crystal molecules are rotated in a plane almost parallel to the substrates to achieve image display; such a device is called as the IPS liquid crystal display device. In the IPS liquid crystal display device, the liquid crystal molecules are always almost parallel to the substrates while the angles formed by the longitudinal directions of the liquid crystal molecules with the absorption axes of the polarizers are changed to display images. Thus, birefringence of the liquid crystal cell is less changed even in oblique directions, and the display device is allowed to have a wide viewing angle.

In the IPS liquid crystal display devices, similar to the case of the VA liquid crystal display devices, two polarizers are disposed orthogonal (in a crossed Nicols state) so as to increase the contrast ratio. Here, the polarizers are apparently not geometrically orthogonal in oblique directions. This causes light leakage upon displaying a black screen, resulting in reduction in the contrast ratio. Thus, the IPS liquid crystal display device may be improved in this respect.

In order to prevent such reduction in the contrast ratio, the IPS liquid crystal display device is also provided with a retardation film. For example, there is disclosed a technique in which the polarizer and the liquid crystal cell sandwich an appropriate biaxial retardation film having an adjusted in-plane retardation and thickness-direction retardation (in-plane retardation is 190 to 390 nm, Nz=0.3 to 0.65) (see Patent Document 7).

There is also disclosed a technique in which multiple retardation films are used in combination, such as a technique in which a negative uniaxial A plate (optic axis 0°) and a positive uniaxial A plate (optic axis 90°) are placed between the viewing-side polarizer (absorption axis 90°) and the back-side polarizer (absorption axis 0°) (see Non-Patent Document 1).

Further, there is disclosed a multilayer polarizing film comprising a positive almost uniaxial optical film, a negative optical film, and a polarizing film stacked in this order, wherein the slow axes thereof are almost parallel to the absorption axes thereof and the retardation of at least one of the almost uniaxial optical film and the negative optical film is made to show reverse wavelength dispersibility (see Patent Document 8).

In addition, there is disclosed a multilayer polarizing film comprising a negative almost uniaxial optical film, a positive optical film, and a polarizing film stacked in this order, wherein the slow axes thereof are almost orthogonal to the absorption axes thereof and the retardation of at least one of the negative almost uniaxial optical film and the positive optical film is made to show reverse wavelength dispersibility (see Patent Document 9).

[Patent Document 1]
    U.S. Pat. No. 6,141,075
[Patent Document 2]
    U.S. Pat. No. 6,661,486
[Patent Document 3]
    U.S. Pat. No. 7,057,689
[Patent Document 4]
    WO 06/001448
[Patent Document 5]
    Japanese Kohyo Publication 2006-514754
[Patent Document 6]
    Japanese Kokai Publication 2001-350022
[Patent Document 7]
    Japanese Kokai Publication H11-305217
[Patent Document 8]
    Japanese Kokai Publication 2007-232873
[Patent Document 9]
    Japanese Kokai Publication 2007-232874
[Non-Patent Document 1]
    XiNzhu, et al., "Super Wide View In-plane Switching LCD with Positive and Negative Uniaxial A-Films Compensation", SID 05 DIGEST, p. 1164-1167

DISCLOSURE OF THE INVENTION

In the techniques of Patent Documents 4 to 6, each retardation layer (other than positive C plates) requires a large retardation |Rxy(550)| and it is generally difficult to produce a retardation film with reverse wavelength dispersion (a wideband retardation film). Thus, the inventions may be improved in this respect. This is because the retardation film with reverse wavelength dispersion is substantially less likely to show retardation. According to the technique of Patent Document 4, production of the positive C plate requires special stretching so as to increase the refractive index in the thickness direction, and thus the positive C plate is generally difficult to produce; the invention may be improved in this respect.

According to the invention of Patent Document 7, materials to be used are limited and the relationship of nx>nz>ny is necessarily achieved so as to satisfy Nz≈0.5. In order to achieve nx>nz>ny, special stretching is required, and thus production of the invention is likely to be difficult; the invention may be improved in this respect.

In the invention of Non-Patent Document 1, conditions for retardation are optimized only at a single wavelength (generally, around 550 nm) although retardations |Rxy(550)| of the positive uniaxial A plate and the negative uniaxial A plate are reduced. Thus, light leakage occurs upon displaying a black screen at wavelengths other than the designated wavelength and coloration (coloring) occurs upon displaying a black screen in oblique directions.

The present invention is devised considering the aforementioned situations. An object of the present invention is to provide a liquid crystal display device which less suffers coloring upon displaying a black screen and achieves a higher contrast ratio in a wide viewing angle range, and is easily produced.

The present inventors have performed various studies on a liquid crystal display device which achieves a higher contrast ratio and less suffers coloring upon displaying a black screen in a wide viewing angle range, and is easily produced; as a result, the present inventors have focused on the conditions for retardation and wavelength dispersion of birefringent layers disposed between a pair of polarizers (first and second polarizers) in a crossed Nicols state.

Thus, the present inventors have found that it is possible to maintain the orthogonality between the first and second polarizers in oblique directions while maintaining the orthogonality between the first and the second polarizers in the frontal direction by appropriately disposing a first birefringent layer satisfying $0.6 \leq Nz(550) \leq 6$ and a second birefringent layer satisfying $-5 \leq Nz(550) \leq 0.4$ between the first polarizer and the second polarizer. Thus, the present inventors have achieved liquid crystal display with a higher contrast ratio in a wide viewing angle range.

In addition, since at least one of the first and second birefringent layers is allowed to have a lower retardation |Rxy(550)| required for maintaining the orthogonality between the first and second polarizers in the case that Nz(550) of the first and second birefringent layers are set in the above range, at least one of the first and second birefringent layers can be a film satisfying $|Rxy(450)| \leq |Rxy(550)| \leq |Rxy(650)|$ (a retardation film with reverse wavelength dispersion). Thus, the present inventors have found that coloring upon displaying a black screen can be reduced in a wide viewing angle range.

The present inventors have further found that the first and second birefringent layers can be produced by a simple method in the case that they each include a material having appropriate intrinsic birefringence, different from a positive C plate and a biaxial retardation film with Nz controlled to about 0.5.

Further studies have provided appropriate conditions for retardation and wavelength dispersion of the first and second birefringent layers. Thus, the present inventors have found the solution of the aforementioned problems and arrived at the present invention.

The present invention provides a liquid crystal display device, comprising: a first polarizer; a second polarizer having an absorption axis orthogonal to an absorption axis of the first polarizer; a liquid crystal cell disposed between the first polarizer and the second polarizer; a first birefringent layer disposed between the first polarizer and the liquid crystal cell; and a second birefringent layer disposed between the liquid crystal cell and the second polarizer, the first birefringent layer satisfying $0.6 \leq Nz(550) \leq 6$ and having an in-plane slow axis orthogonal to the absorption axis of the first polarizer, the second birefringent layer satisfying $-5 \leq Nz(550) \leq 0.4$ and having an in-plane slow axis parallel to the absorption axis of the second polarizer, and at least one of the first and second birefringent layers satisfying $|Rxy(450)| \leq |Rxy(550)| \leq |Rxy(650)|$.

The following will describe the present invention in detail.

The liquid crystal display device of the present invention includes a first polarizer, a second polarizer having the absorption axis orthogonal to the absorption axis of the first polarizer, and a liquid crystal cell disposed between the first polarizer and the second polarizer.

The term "polarizer" herein represents an element which converts natural light into linearly polarized light. Either of the first and second polarizers may be a polarizer (a back-side polarizer) and may be an analyzer (a viewing-side polarizer).

The liquid crystal cell generally includes a pair of substrates and a liquid crystal layer disposed between the substrates. The first polarizer and the second polarizer are placed so that the absorption axes are orthogonal to each other (crossed Nicols), and the liquid crystal cell does not show birefringence in the frontal direction when no voltage is applied. Thus, the liquid crystal display device of the present invention displays an almost perfectly black screen in the frontal direction when no voltage is applied.

The liquid crystal display device has a first birefringent layer between the first polarizer and the liquid crystal cell, and a second birefringent layer between the liquid crystal cell and the second polarizer.

The term "birefringent layer" herein means a layer having optical anisotropy, and preferably a layer in which at least one of $|Rxy(550)|$ and $|Rxz(550)|$ is 15 nm or more. The birefringent layer herein is synonymous with a retardation film, retardation plate, optically anisotropic layer, birefringent medium, and the like.

The liquid crystal display device of the present invention is not especially limited as long as it comprises the first polarizer, the second polarizer, the liquid crystal cell, the first birefringent layer, and the second birefringent layer as structural components, and other components are not particularly limited by the structural elements.

The first birefringent layer satisfies $0.6 \leq Nz(550) \leq 6$, and has an in-plane slow axis orthogonal to the absorption axis of the first polarizer.

The term "$Nz(\lambda)$" herein represents an Nz coefficient at a wavelength of $\lambda$ nm. Assuming that the principal refractive indices of a birefringent layer in the in-plane direction are represented as nx and ny (nx>ny) and the principal refractive index thereof in the out-of-plane direction is nz, the Nz coefficient is defined as $Nz=(nx-nz)/(nx-ny)$.

The first birefringent layer having an Nz(550) of less than 0.6 requires special stretching. Thus, such a birefringent layer may be difficult to produce. The first birefringent layer having an Nz(550) of more than 6 is allowed to have a lower retardation $|Rxy(550)|$ which is required for maintaining orthogonality between the first and second polarizers in oblique directions. In this case, however, the second birefringent layer requires a higher retardation $|Rxy(550)|$. Thus, the second birefringent layer may not be allowed to have reverse wavelength dispersibility.

The first birefringent layer preferably satisfies $1.1 \leq Nz(550) \leq 2$. The first birefringent layer satisfying $1.1 \leq Nz(550) \leq 2$ is easily produced because it can be produced by stretching a material with positive intrinsic birefringence in the y-direction with the material flowed in the x-direction (flow direction), that is, only by lateral uniaxial stretching of the material.

In this respect, the first birefringent layer preferably includes a material having positive intrinsic birefringence.

The second birefringent layer satisfies $-5 \leq Nz(550) \leq 0.4$, and has an in-plane slow axis parallel to the absorption axis of the second polarizer. The second birefringent layer having an Nz(550) of less than −5 is allowed to have a lower retardation $|Rxy(550)|$ which is required for maintaining orthogonality between the first and second polarizers in oblique directions. In this case, however, the first birefringent layer requires a higher retardation $|Rxy(550)|$ in this case. Thus, the first birefringent layer may not be allowed to have reverse wavelength dispersibility. The second birefringent layer having an Nz(550) of more than 0.4 requires special stretching. Thus, such a birefringent layer may be difficult to produce.

The second birefringent layer preferably satisfies $-1 \leq Nz(550) \leq -0.1$. The second birefringent layer satisfying $-1 \leq Nz(550) \leq -0.1$ is easily produced because it can be produced by stretching a material with negative intrinsic birefringence in the y-direction with the material flowed in the x-direction (flow direction), that is, only by lateral uniaxial stretching of the material.

In this respect, the second birefringent layer preferably includes a material having negative intrinsic birefringence.

In order to achieve a higher contrast ratio in a wide viewing angle range (a viewing-angle compensation) without reduction in the contrast ratio in the frontal direction, the in-plane slow axis of the first birefringent layer and the absorption axis of the first polarizer are basically required to form an angle of 90° and the in-plane slow axis of the second birefringent layer and the absorption axis of the second polarizer are basically required to form an angle of 0°. Here, the in-plane slow axis of the first birefringent layer and the absorption axis of the first polarizer may form an angle which slightly deviates from 90° as long as they are substantially orthogonal to each other. Similarly, the in-plane slow axis of the second birefringent layer and the absorption axis of the second polarizer may form an angle which slightly deviates from 0° as long as they are substantially parallel to each other. This is because as follows.

In order to maintain the contrast ratio in the frontal direction, it is required to (1) disable the birefringent layers in the frontal direction. In order to compensate the viewing angle, it is required to (2) enable the birefringent layers in oblique directions. In order to satisfy the condition (1), the birefringent layer and the polarizer are required to satisfy either of the following axial relationships: (a) the optic axis of the polarizer and the optic axis of the birefringent layer are parallel; and (b) the optic axis of the polarizer and the optic axis of the birefringent layer are orthogonal.

The term "optic axis" herein does not represent the optic axis strictly used in crystal optics, and is defined as follows. Assuming that the average value of the three principal refractive indices of the birefringent layer is calculated and then the difference between each principal refractive index and the average value is calculated, the principal axis which corresponds to the principal refractive index having the maximum absolute value of the difference is the "optic axis" herein. According to this definition, an optically biaxial birefringent layer has not two but a single "optic axis." As mentioned here, the "optic axis" of the biaxial birefringent layer corresponds to the optic axis of the conventional definition when it is optically approximated to a uniaxial birefringent layer.

In order to satisfy the condition (2), the axes are required to satisfy not the relationship (a) but the relationship (b). This is because as follows.

When light is incident into a laminate of the polarizers and the birefringent layers from an oblique direction, the birefringent layer shows substantially no contribution in the oblique direction in the case that the effective transmission axis of the polarizer viewed from the oblique direction is parallel to at least one of the vibrating directions in the two eigenmodes of vibration of the birefringent layer (the vibrating direction of the electrical potential displacement vector D) to the incident light from the oblique direction. That is, in order to enable the birefringent layer in the oblique direction, the effective transmission axis of the polarizer viewed from the oblique direction is required to be neither parallel nor perpendicular to the vibrating direction in the eigenmodes of polarization of the birefringent layer.

In the case that the optic axis of the polarizer and the optic axis of the birefringent layer are parallel as in the condition (a), the effective transmission axis of the polarizer is parallel to at least one of the vibrating direction in the two eigenmodes of vibration of the birefringent layer viewed from any direction. Thus, the birefringent layer is disabled.

In contrast, in the case that the optic axis of the polarizer and the optic axis of the birefringent layer are orthogonal as in the condition (b), the effective transmission axis of the polarizer is neither parallel nor orthogonal to the vibrating direction in the eigenmodes of polarization of the birefringent layer viewed from oblique directions. Thus, the birefringent layer is enabled.

The polarizer in the present invention is preferably what is called an O-type polarizer. The O-type polarizer absorbs light vibrating in a specific direction in the plane of the element (defined as the absorption axis), and transmits light vibrating in the direction orthogonal to the absorption axis in the plane of the element and light vibrating in the normal direction of the element. That is, the O-type polarizer has one absorption axis and two transmission axes, and the optic axis of the O-type polarizer is along the absorption axis. Examples of the O-type polarizer include one made of a polyvinyl alcohol (PVA) film with a dichroic anisotropic material such as an iodine complex adsorbed and aligned thereon.

The first birefringent layer satisfying $Nz=1$ serves as a uniaxial birefringent layer and the in-plane slow axis thereof serves as the optic axis. Here, in the case that the first birefringent layer satisfies $0.6 \leq Nz(550) \leq 6$, the optic axis thereof is parallel to the in-plane slow axis. Thus, the in-plane slow axis of the first birefringent layer and the absorption axis of the first polarizer are basically required to form an angle of 90°. The angle may slightly deviate from 90° as long as the viewing angle is compensated without reduction in the contrast ratio in the frontal direction.

The second birefringent layer satisfying $Nz=0$ serves as a uniaxial birefringent layer and the axis orthogonal to the in-plane slow axis (the in-plane fast axis) thereof serves as the optic axis. Here, in the case that the second birefringent layer satisfies $-5 \leq Nz(550) \leq 0.4$, the optic axis thereof is parallel to the in-plane fast axis. Thus, the in-plane slow axis of the second birefringent layer and the absorption axis of the second polarizer are basically required to form an angle of 0°. The angle may slightly deviate from 0° as long as the viewing angle is compensated without reduction in the contrast ratio in the frontal direction.

At least one of the first and second birefringent layers satisfies $|Rxy(450)| \leq |Rxy(550)| \leq |Rxy(650)|$. The terms "$Rxy(\lambda)$" and "$Ryz(\lambda)$" herein represent the retardations Rxy and Ryz at a wavelength of $\lambda$ nm. Assuming that the thickness of the birefringent layer is d, Rxy is defined as $Rxy=(nx-ny) \times d$ and Ryz is defined as $Ryz=(ny-nz) \times d$.

The liquid crystal display device preferably satisfies $R'xy(450) \leq R'xy(550) \leq R'xy(650)$, wherein $R'xy(\lambda)$ represents an arithmetic mean between $\lambda Rxy(\lambda)|$ of the first birefringent layer and $|Rxy(\lambda)|$ of the second birefringent layer. This allows the effective condition of wavelength dispersion to be reverse wavelength dispersion in a pair of birefringent layers (the first and second birefringent layers) disposed between a pair of polarizers (the first and second polarizers) in the crossed Nicols state. Thus, coloring upon displaying a black screen is further prevented. It is more preferable that both of the first and second birefringent layers satisfy $|Rxy(450)| \leq |Rxy(550)| \leq |Rxy(650)|$.

The liquid crystal display device preferably satisfies $0 \leq Nz'(550) \leq 1$, wherein $Nz'(550)$ represents an arithmetic mean between $Nz(550)$ of the first birefringent layer and $Nz(550)$ of the second birefringent layer. This enables preferable retention of the orthogonality between the first and second polarizers even in oblique directions. Thus, a still higher contrast ratio is achieved in a wide viewing angle range. In order to preferably maintain the orthogonality between the first and second polarizers even in oblique directions, the liquid crystal display device more preferably satisfies $0.3 \leq Nz'(550) \leq 0.7$, further preferably satisfies $0.4 \leq Nz'(550) \leq 0.6$, and particularly preferably satisfies $Nz'(550)=0.5$.

At least one of the first and second birefringent layers satisfies preferably $|Rxy(550)| \leq 130$ nm, more preferably $|Rxy(550)| \leq 110$ nm, and further preferably $|Rxy(550)| \leq 100$ nm. It is more preferable that both of the first and second birefringent layers satisfy $|Rxy(550)| \leq 130$ nm, further preferable that both satisfy $|Rxy(550)| \leq 110$ nm, and particularly preferable that both satisfy $|Rxy(550)| \leq 100$ nm.

The preferable embodiments of the liquid crystal display device are classified as follows according to the difference between the degrees of biaxiality of the first and second birefringent layers. In the case of serving as a uniaxial birefringent layer, the first birefringent layer satisfies $Nz=1$, and the second birefringent layer satisfies $Nz=0$. Thus, the biaxial parameter $\Delta Nz1$ of the first birefringent layer is defined as $|Nz(550)-1|$, and the biaxial parameter $\Delta Nz2$ of the second birefringent layer is defined as $|Nz(550)|$.

Here, examples of the embodiments include the following embodiments (1) to (3): (1) $\Delta Nz1=\Delta Nz2$ is satisfied, and the first and second birefringent layers satisfy 35 nm $\leq |Rxy(550)| \leq 95$ nm; (2) $\Delta Nz1 < \Delta Nz2$ is satisfied, the first birefringent layer satisfies 90 nm $\leq |Rxy(550)| \leq 130$ nm, and the second birefringent layer satisfies 15 nm $\leq |Rxy(550)| \leq 95$ nm; and (3) $\Delta Nz1 > \Delta Nz2$ is satisfied, the first birefringent layer satisfies 15 nm $\leq |Rxy(550)| \leq 95$ nm, and the second birefringent layer satisfies 90 nm $\leq |Rxy(550)| \leq 130$ nm.

The first birefringent layer satisfies $0.6 \leq Nz(550) \leq 6$ and the second birefringent layer satisfies $-5 \leq Nz(550) \leq 0.4$. Thus, the liquid crystal display device satisfies $0 \leq \Delta Nz1 \leq 5$ and $0 \leq \Delta Nz2 \leq 5$. In the embodiment (1), the first and second birefringent layers have the same degree of biaxiality, and $Nz'(550)=0.5$ is satisfied. In this embodiment, the first and second birefringent layers each require a retardation $|Rxy(550)|$ almost equal to each other, and the retardations may be low. Thus, at least one of the first and second birefringent layers are allowed to serve as a film satisfying $|Rxy(450)| \leq |Rxy(550)| \leq |Rxy(650)|$ (a retardation film with reverse wavelength dispersion). This results in prevention of coloring upon displaying a black screen and enables liquid crystal display with a higher contrast ratio in a wide viewing angle range.

FIG. 8 and Table 1 show the relationship between ΔNz1, ΔNz2, and an optimum |Rxy(550)| in the case that ΔNz1=ΔNz2 is satisfied (in the figure, "■" represents the first birefringent layer and "▲" represents the second birefringent layer).

TABLE 1

| ΔNz1, ΔNz2 | First birefringent layer optimum \|Rxy(550)\| (nm) | Second birefringent layer optimum \|Rxy(550)\| (nm) |
|---|---|---|
| 0 | 92 | 92 |
| 0.3 | 80 | 80 |
| 0.4 | 77 | 77 |
| 0.5 | 74 | 74 |
| 1 | 64 | 64 |
| 4 | 41 | 41 |
| 5 | 38 | 38 |
| 10 | 29 | 29 |

FIG. 8 and Table 1 show that |Rxy(550)| of less than 38 nm may cause failure in sufficiently obtaining the effects of the present invention even in the case of the maximum ΔNz1 and ΔNz2 (ΔNz1=ΔNz2=5), while |Rxy(550)| of higher than 92 nm may cause failure in sufficiently obtaining the effects of the present invention even in the case of the minimum ΔNz1 and ΔNz2 (ΔNz1=ΔNz2=0).

The above results show that the first and second birefringent layers preferably satisfy 35 nm≦|Rxy(550)|≦95 nm in the case that ΔNz1=ΔNz2 is satisfied. More preferably, the first and second birefringent layers preferably satisfy 50 nm≦|Rxy(550)|≦80 nm in the case that ΔNz1=ΔNz2 is satisfied.

In the embodiment (2), the first birefringent layer has a relatively low biaxial parameter and the second birefringent layer has a relatively high biaxial parameter. In this embodiment, the second birefringent layer requires a lower retardation |Rxy(550)| as compared with the embodiment (1). Thus, the second birefringent layers is allowed to serve as a film satisfying |Rxy(450)|≦|Rxy(550)|≦|Rxy(650)| (a retardation film with reverse wavelength dispersion). This results in prevention of coloring upon displaying a black screen and enables liquid crystal display with a higher contrast ratio in a wide viewing angle range.

FIG. 9 and Table 2 show the relationship between ΔNz1, ΔNz2, and an optimum |Rxy(550)| in the case that ΔNz1<ΔNz2 is satisfied (in the figure, "■" represents the first birefringent layer and "▲" represents the second birefringent layer).

TABLE 2

| ΔNz1, ΔNz2 | First birefringent layer optimum \|Rxy(550)\| (nm) | Second birefringent layer optimum \|Rxy(550)\| (nm) |
|---|---|---|
| 0 | 92 | 92 |
| 0.3 | 103 | 70 |
| 0.4 | 106 | 64 |
| 0.5 | 108 | 60 |
| 1 | 116 | 45 |
| 4 | 129 | 18 |
| 5 | 131 | 15 |
| 10 | 134 | 8 |

FIG. 9 and Table 2 show that if |Rxy(550)| of the first birefringent layer is less than 92 nm, the effects of the present invention may be insufficiently obtained even in the case of the minimum ΔNz1 (ΔNz1=0). If |Rxy(550)| of the first birefringent layer is higher than 131 nm, the effects of the present invention may be insufficiently obtained even in the case of the maximum ΔNz1 (ΔNz1=5).

If |Rxy(550)| of the second birefringent layer is less than 15 nm, the effects of the present invention may be insufficiently obtained even in the case of the maximum ΔNz2 (ΔNz2=5). If |Rxy(550)| of the second birefringent layer is higher than 92 nm, the effects of the present invention may be insufficiently obtained even in the case of the minimum ΔNz2 (ΔNz2=0).

The above results show that the first birefringent layer preferably satisfies 90 nm≦|Rxy(550)|≦130 nm and the second birefringent layer preferably satisfies 15 nm≦|Rxy(550)|≦95 nm in the case that ΔNz1<ΔNz2 is satisfied. More preferably, the first birefringent layer satisfies 105 nm≦|Rxy(550)|≦115 nm and the second birefringent layer satisfies 30 nm≦|Rxy(550)|≦80 nm in the case that ΔNz1<ΔNz2 is satisfied.

In the embodiment (3), the first birefringent layer has a relatively high biaxial parameter and the second birefringent layer has a relatively low biaxial parameter. In this embodiment, the first birefringent layer requires a lower retardation |Rxy(550)| as compared with the embodiment (1). Thus, the first birefringent layers is allowed to serve as a film satisfying |Rxy(450)|≦|Rxy(550)|≦|Rxy(650)| (a retardation film with reverse wavelength dispersion). This results in prevention of coloring upon displaying a black screen and enables liquid crystal display with a higher contrast ratio in a wide viewing angle range.

FIG. 10 and Table 3 show the relationship between ΔNz1, ΔNz2, and an optimum |Rxy(550)| in the case that ΔNz1>ΔNz2 is satisfied (in the figure, "■" represents the first birefringent layer and "▲" represents the second birefringent layer).

TABLE 3

| ΔNz1, ΔNz2 | First birefringent layer optimum \|Rxy(550)\| (nm) | Second birefringent layer optimum \|Rxy(550)\| (nm) |
|---|---|---|
| 0 | 92 | 92 |
| 0.3 | 70 | 103 |
| 0.4 | 64 | 106 |
| 0.5 | 60 | 108 |
| 1 | 45 | 116 |
| 4 | 18 | 129 |
| 5 | 15 | 131 |
| 10 | 8 | 134 |

FIG. 10 and Table 3 show that if |Rxy(550)| of the first birefringent layer is less than 15 nm, the effects of the present invention may be insufficiently obtained even in the case of the maximum ΔNz1 (ΔNz1=5). If |Rxy(550)| of the first birefringent layer is higher than 92 nm, the effects of the present invention may be insufficiently obtained even in the case of the minimum ΔNz1 (ΔNz1=0).

If |Rxy(550)| of the second birefringent layer is less than 92 nm, the effects of the present invention may be insufficiently obtained even in the case of the minimum ΔNz2 (ΔNz2=0). If |Rxy(550)| of the second birefringent layer is higher than 131 nm, the effects of the present invention may be insufficiently obtained even in the case of the maximum ΔNz2 (ΔNz2=5).

The above results show that the first birefringent layer preferably satisfies 15 nm≦|Rxy(550)|≦95 nm and the second birefringent layer preferably satisfies 90 nm≦|Rxy(550)|≦130 nm in the case that ΔNz1>ΔNz2 is satisfied. More preferably, the first birefringent layer satisfies 30 nm≦|Rxy(550)|≦80 nm and the second birefringent layer satisfies 105 nm≦|Rxy(550)|≦115 nm in the case that ΔNz1>ΔNz2 is satisfied.

Preferably, the liquid crystal display device displays a black screen by aligning liquid crystal molecules in the liquid crystal cell perpendicular to the substrate surface, and has a third birefringent layer satisfying $10 \leq Nz(550) \leq \infty$ between the first polarizer and the second polarizer. Disposing of the third birefringent layer enables cancellation of excessive retardation of the liquid crystal cell in oblique directions upon displaying a black screen. Thus, coloring upon displaying a black screen is further prevented and a higher contrast ratio is achieved in a wide viewing angle range.

If the Nz(550) of the third birefringent layer is less than 10, the in-plane retardation |Rxy(550)| of the third birefringent layer may cause the liquid crystal cell to have different effects of canceling excessive retardation in oblique directions upon displaying a black screen, or to have a lower contrast ratio in the frontal direction. Here, the third birefringent layer satisfying Nz=∞ is a uniaxial birefringent layer with the axis in the normal direction serving as the optic axis.

In order to effectively achieve the effects of the present invention, the third birefringent layer is preferably disposed adjacent to the liquid crystal cell.

The phrase "disposed adjacent to" herein means that no birefringent medium is disposed between the third birefringent layer and the liquid crystal cell, as well as that the third birefringent layer and the liquid crystal cell are directly contact. For example, one embodiment in which an isotropic film is disposed between the third birefringent layer and the liquid crystal cell is included in the embodiments in which the third birefringent layer is disposed adjacent to the liquid crystal cell.

Examples of the display mode which displays a black screen by aligning liquid crystal molecules in the liquid crystal cell perpendicular to the surface of the substrates include TN modes, ECB modes, VA modes, and OCE modes. Upon displaying a black screen, the liquid crystal molecules in the liquid crystal cell may not be aligned by 90° to the surface of the substrate, and is required only to be aligned substantially perpendicular to the surface of the substrate.

EFFECTS OF THE INVENTION

The liquid crystal display device of the present invention comprises the first birefringent layer satisfying $0.6 \leq Nz(550) \leq 6$ and the second birefringent layer satisfying $-5 \leq Nz(550) \leq 0.4$ in combination, and thus each birefringent layer requires a lower retardation |Rxy(550)|. As a result, the liquid crystal display device can be easily produced, easily allowed to have reverse wavelength dispersibility, and have wideband viewing-angle compensation. Thus, the liquid crystal display device of the present invention is suitably used for applications such as televisions, monitors, and mobile display devices.

BEST MODE FOR CARRYING OUT THE INVENTION (Birefringent Layer)

With respect to the birefringent layer used in the present invention, the specific materials and optical characteristics other than Nz(550) are not especially limited. Examples of the materials include thin plates made of inorganic materials, stretched polymer films, ones in which alignment of liquid crystalline molecules is fixed.

The method for producing the birefringent layer is not particularly limited. In the case of films, examples of the production method include solution casting and extrusion molding. Multiple birefringent layers may be simultaneously produced by co-extrusion. The film may not be stretched or may be appropriately stretched as long as the determined retardation is achieved. The method for stretching the film is also not particularly limited. Examples thereof include tensile stretching between rolls, compression stretching between rolls, lateral uniaxial stretching with a tenter, lateral and longitudinal biaxial stretching, and special stretching in which stretching is performed under the contractile force of a heat-shrinkable film.

In the case of liquid crystalline compounds, the production method is also not particularly limited. Examples thereof include a method in which a substrate film is subjected to an appropriate aligning treatment and then a liquid crystalline compound is applied to the treated film, and thereby the alignment of the compound is fixed. As long as the determined retardation is achieved, the method may be one in which a substrate film is not particularly subjected to an aligning treatment and a liquid crystalline compound is applied to the untreated film, and thereby the alignment of the compound is fixed, or one in which the liquid crystalline compound with the alignment fixed is peeled off from the substrate film, and then transferred to another film. In the case of the liquid crystalline compounds, the method may be one in which the alignment is not fixed.

Even in the case of non-liquid crystalline compounds, the same formation methods may be used as those for the liquid crystalline compounds. The following will in more detail describe the birefringent layers classified by types.

(First Birefringent Layer)

The first birefringent layer may include a material such as one formed by stretching a polymer film with positive intrinsic birefringence and one coated with a liquid crystalline compound e.g. nematic liquid crystal. Examples of the polymer film material with positive intrinsic birefringence include polycarbonate, polysulfone, polyether sulfone, polyethylene terephthalate, polyethylene, polyvinyl alcohol, norbornene, triacetyl cellulose, and diatyl cellulose.

(Second Birefringent Layer)

The second birefringent layer may include a material such as one formed by stretching a polymer film with negative intrinsic birefringence, one formed by stretching a resin film with positive intrinsic birefringence under the influence of contractile force of a thermo-shrinkable film, and one coated with a liquid crystalline compound e.g. discotic liquid crystal. For simplification of the production method, one formed by stretching a polymer film with negative intrinsic birefringence is preferable. Examples of the polymer film material with negative intrinsic birefringence include polystyrene, polyvinyl naphthalene, polyvinyl biphenyl, polyvinyl pyridine, polymethyl methacrylate, polymethyl acrylate, N-substituted maleimide copolymers, and fluorene skeleton-containing polycarbonate.

(Third Birefringent Layer)

The third birefringent layer may include a material such as one formed by stretching a polymer film with positive intrinsic birefringence, one coated with a liquid crystalline compound e.g. a chiral nematic liquid crystal and a discotic liquid crystal, and one coated with a non-liquid crystalline compound including a polymer e.g. polyimide and polyamide.

(Polarizer)

The polarizer is not particularly limited, and examples thereof include a polyvinyl alcohol (PVA) film with a dichroic anisotropic material such as an iodine complex adsorbed and aligned thereon.

(Liquid Crystal Cell)

The display mode of the liquid crystal cell is not particularly limited, and examples thereof include TN modes, ECB modes, VA modes, OCR modes, and IPS modes. Examples of the VA modes include MVA modes, PVA modes, EVA modes, and Reverse TN modes.

(Method for Measuring Retardations Rxy(550) and Rxz (550))

The retardations were measured with a spectroscopic ellipsometer (M-220, JASCO Corp.). Rxy(550) was measured from the normal direction of the retardation film. Rxz(550) was calculated by curve fitting with a known index ellipsoid. For the calculation, retardations of the retardation film were measured from the normal direction, the direction with an inclination angle of 40° from the normal direction, and the direction with an inclination angle of −40° from the normal direction. Azimuths of the inclinations each were made orthogonal to the in-plane slow axis.

(Method for Measuring Viewing Angle Dependence of Contrast of Liquid Crystal Display Device)

The viewing angle dependence of contrast was measured with a viewing angle measuring apparatus (Ez-Contrast 160, ELDIM). The light source was a backlight mounted on a liquid crystal television (LC37-GH1, SHARP Corp.). Brightnesses upon displaying a white screen and a black screen were measured in the oblique direction with an azimuth angle of 45° (the direction bisecting the angle formed by the absorption axis of the first polarizer and the absorption axis of the second polarizer) and an inclination angle of 60° (the direction inclined by 60° from the normal direction). The ratio thereof was represented as CR (45, 60).

(Method for Measuring Viewing Angle Dependence of Chromaticity of Liquid Crystal Display Device)

The viewing angle dependence of chromaticity was measured with a viewing angle measuring apparatus (Ez-Contrast 160, ELDIM). The light source was a backlight mounted on a liquid crystal television (LC37-GH1, SHARP Corp.). The measurement provided the u'v' chromaticity point on the black screen in the frontal direction (inclination angle: 0°) and the u'v' chromaticity point on the black screen in the oblique direction of an azimuth angle of 45° (the direction bisecting the angle formed by the absorption axis of the first polarizer and the absorption axis of the second polarizer) and an inclination angle of 60° (the direction inclined by 60° from the normal direction). The distance between the two points was represented as ΔE (45, 60).

$11g$, a first birefringent layer $21g$, a third birefringent layer $23g$, a VA liquid crystal cell $50g$, a second birefringent layer $22g$, a second polarizer $12g$, and a TAC film $20g$, in this order. The VA liquid crystal cell $50g$ includes a back-side substrate $1g$, a viewing-side substrate $2g$, and liquid crystal molecules $3g$ which are disposed between the substrates and are aligned perpendicular to the surfaces of the substrates when no voltage is applied.

In FIG. 1, the symbol "s" represents the direction of the slow axis of each birefringent layer, the symbol "a" represents the direction of the absorption axis of each polarizer, and the symbol "L" represents the direction of the longitudinal axis of the liquid crystal molecules. The same is applied to FIGS. 2 to 7.

The materials, optical characteristics, and axial designs of the birefringent films, the polarizers, and the liquid crystal cell of the present embodiment are as shown in Table 4. Table 4 does not show the optical characteristics of the TAO films because the TAC films disposed outside the polarizer (the side closer to the liquid crystal cell is defined as the inside, and the side farther therefrom is defined as the outside) have no influence on the optical characteristics of the liquid crystal display device if it is transparent. In the table, the name of the material of each birefringent layer is indicated by means of the following abbreviations.

PMMA: polymethylmethacrylate
NB: norbornene
TAC: triacetyl cellulose
Z: isotropic film
G: resin film with reverse wavelength dispersibility
PC: polycarbonate In the table, $\alpha$, $\beta$, $\alpha'$, and $\beta'$ are calculated by the following formulas (1) to (4).

$$\alpha = |Rxy(450)|/|Rxy(550)| \qquad (1)$$

$$\beta = |Rxy(650)|/|Rxy(550)| \qquad (2)$$

$$\alpha' = R'xy(450)/R'xy(550) \qquad (3)$$

$$\beta' = R'xy(650)/R'xy(550) \qquad (4)$$

TABLE 4

| | Optical components | Material | Angle [°] | \|Rxy(550)\| [nm] | Rxz(550) [nm] | Nz(550) | α | β | α' | β' | CR (45, 60) | ΔE (45, 60) |
|---|---|---|---|---|---|---|---|---|---|---|---|---|
| Embodiment 1 | Second polarizer | | 0 | | | | | | 1.01 | 1.00 | 75 | 0.10 |
| | Second birefringent layer | PMMA | 0 | 90 | −3 | 0.0 | 1.05 | 0.98 | | | | |
| | VA liquid crystal cell | | | 0 | 320 | | 1.05 | 0.97 | | | | |
| | Third birefringent layer | NB | | 5 | 305 | | 1.00 | 1.00 | | | | |
| | First birefringent layer | G | 0 | 90 | 91 | 1.0 | 0.96 | 1.02 | | | | |
| | First polarizer | | 90 | | | | | | | | | |

The present invention is mentioned in more detail showing embodiments but not limited to these embodiments.

Embodiment 1

FIG. 1 is a perspective view that schematically shows the structure of the liquid crystal display device of Embodiment 1.

As shown in FIG. 1, the liquid crystal display device of the present embodiment is a VA liquid crystal display device $100g$ produced by stacking a TAC film $10g$, a first polarizer Embodiments 2 to 16

The liquid crystal display devices of Embodiments 2 to 16 each are almost the same liquid crystal display device of Embodiment 1 except that the materials, optical characteristics, and axial designs of the birefringent films, polarizers, and liquid crystal cell each are changed to those shown in Tables 5 to 7.

TABLE 5

| | Optical components | Material | Angle [°] | \|Rxy(550)\| [nm] | Rxz(550) [nm] | Nz(550) | α | β | α' | β' | CR (45, 60) | ΔE (45, 60) |
|---|---|---|---|---|---|---|---|---|---|---|---|---|
| Embodiment 2 | Second polarizer | | 0 | | | | | | 1.02 | 0.99 | 75 | 0.12 |
| | Second birefringent layer | G | 0 | 92 | 0 | 0.0 | 0.96 | 1.02 | | | | |
| | VA liquid crystal cell | | | 0 | 320 | | 1.05 | 0.97 | | | | |
| | Third birefringent layer | NB | | 5 | 305 | | 1.00 | 1.00 | | | | |
| | First birefringent layer | PC | 0 | 90 | 91 | 1.0 | 1.08 | 0.96 | | | | |
| | First polarizer | | 90 | | | | | | | | | |
| Embodiment 3 | Second polarizer | | 0 | | | | | | 0.98 | 1.01 | 77 | 0.07 |
| | Second birefringent layer | NB | 0 | 80 | −24 | −0.3 | 1.00 | 1.00 | | | | |
| | VA liquid crystal cell | | | 0 | 320 | | 1.05 | 0.97 | | | | |
| | Third birefringent layer | NB | | 5 | 305 | | 1.00 | 1.00 | | | | |
| | First birefringent layer | G | 0 | 80 | 104 | 1.3 | 0.96 | 1.02 | | | | |
| | First polarizer | | 90 | | | | | | | | | |
| Embodiment 4 | Second polarizer | | 0 | | | | | | 0.98 | 1.01 | 76 | 0.07 |
| | Second birefringent layer | NB | 0 | 82 | −8 | −0.1 | 1.00 | 1.00 | | | | |
| | VA liquid crystal cell | | | 0 | 320 | | 1.05 | 0.97 | | | | |
| | Third birefringent layer | NB | | 5 | 305 | | 1.00 | 1.00 | | | | |
| | First birefringent layer | G | 0 | 97 | 98 | 1.0 | 0.96 | 1.02 | | | | |
| | First polarizer | | 90 | | | | | | | | | |
| Embodiment 5 | Second polarizer | | 0 | | | | | | 0.98 | 1.01 | 76 | 0.08 |
| | Second birefringent layer | NB | 0 | 76 | −15 | −0.2 | 1.00 | 1.00 | | | | |
| | VA liquid crystal cell | | | 0 | 320 | | 1.05 | 0.97 | | | | |
| | Third birefringent layer | NB | | 5 | 305 | | 1.00 | 1.00 | | | | |
| | First birefringent layer | G | 0 | 102 | 102 | 1.0 | 0.96 | 1.02 | | | | |
| | First polarizer | | 90 | | | | | | | | | |
| Embodiment 6 | Second polarizer | | 0 | | | | | | 0.98 | 1.01 | 76 | 0.08 |
| | Second birefringent layer | NB | 0 | 70 | −20 | −0.3 | 1.00 | 1.00 | | | | |
| | VA liquid crystal cell | | | 0 | 320 | | 1.05 | 0.97 | | | | |
| | Third birefringent layer | NB | | 5 | 305 | | 1.00 | 1.00 | | | | |
| | First birefringent layer | G | 0 | 99 | 100 | 1.0 | 0.96 | 1.02 | | | | |
| | First polarizer | | 90 | | | | | | | | | |

TABLE 6

| | Optical components | Material | Angle [°] | \|Rxy(550)\| [nm] | Rxz(550) [nm] | Nz(550) | α | β | α' | β' | CR (45, 60) | ΔE (45, 60) |
|---|---|---|---|---|---|---|---|---|---|---|---|---|
| Embodiment 7 | Second polarizer | | 0 | | | | | | 0.98 | 1.01 | 76 | 0.08 |
| | Second birefringent layer | NB | 0 | 95 | −3 | 0.0 | 1.00 | 1.00 | | | | |
| | VA liquid crystal cell | | | | 320 | | 1.05 | 0.97 | | | | |
| | Third birefringent layer | NB | | 5 | 305 | | 1.00 | 1.00 | | | | |
| | First birefringent layer | G | 0 | 85 | 92 | 1.1 | 0.96 | 1.02 | | | | |
| | First polarizer | | 90 | | | | | | | | | |
| Embodiment 8 | Second polarizer | | 0 | | | | | | 0.98 | 1.01 | 76 | 0.08 |
| | Second birefringent layer | NB | 0 | 102 | −5 | 0.0 | 1.00 | 1.00 | | | | |
| | VA liquid crystal cell | | | | 320 | | 1.05 | 0.97 | | | | |
| | Third birefringent layer | NB | | 5 | 305 | | 1.00 | 1.00 | | | | |
| | First birefringent layer | G | 0 | 75 | 90 | 1.2 | 0.96 | 1.02 | | | | |
| | First polarizer | | 90 | | | | | | | | | |
| Embodiment 9 | Second polarizer | | 0 | | | | | | 0.98 | 1.01 | 76 | 0.08 |
| | Second birefringent layer | NB | 0 | 102 | −3 | 0.0 | 1.00 | 1.00 | | | | |
| | VA liquid crystal cell | | | | 320 | | 1.05 | 0.87 | | | | |
| | Third birefringent layer | NB | | 5 | 305 | | 1.00 | 1.00 | | | | |
| | First birefringent layer | G | 0 | 70 | 88 | 1.3 | 0.96 | 1.02 | | | | |
| | First polarizer | | 90 | | | | | | | | | |
| Embodiment 10 | Second polarizer | | 0 | | | | | | 0.96 | 1.02 | 78 | 0.07 |
| | Second birefringent layer | NB | 0 | 90 | −3 | 0.0 | 1.00 | 1.00 | | | | |
| | VA liquid crystal cell | | | 0 | 320 | | 1.05 | 0.97 | | | | |
| | Third birefringent layer | NB | | 5 | 305 | | 1.00 | 1.00 | | | | |
| | First birefringent layer | G | 0 | 90 | 91 | 1.0 | 0.91 | 1.03 | | | | |
| | First polarizer | | 90 | | | | | | | | | |
| Embodiment 11 | Second polarizer | | 0 | | | | | | 0.98 | 1.01 | 82 | 0.09 |
| | Second birefringent layer | G | 0 | 90 | −3 | 0.0 | 0.96 | 1.02 | | | | |
| | VA liquid crystal cell | | | 0 | 320 | | 1.05 | 0.97 | | | | |
| | Third birefringent layer | NB | | 5 | 305 | | 1.00 | 1.00 | | | | |
| | First birefringent layer | NB | 0 | 90 | 91 | 1.0 | 1.00 | 1.00 | | | | |
| | First polarizer | | 90 | | | | | | | | | |

TABLE 7

| | Optical components | Material | Angle [°] | \|Rxy(550)\| [nm] | Rxz(550) [nm] | Nz(550) | α | β | α' | β' | CR (45, 60) | ΔE (45, 60) |
|---|---|---|---|---|---|---|---|---|---|---|---|---|
| Embodiment 12 | Second polarizer | | 0 | | | | | | 0.94 | 1.03 | 85 | 0.02 |
| | Second birefringent layer | G | 0 | 90 | −3 | 0.0 | 0.96 | 1.02 | | | | |
| | VA liquid crystal cell | | | 0 | 320 | | 1.05 | 0.97 | | | | |
| | Third birefringent layer | NB | | 5 | 305 | | 1.00 | 1.00 | | | | |
| | First birefringent layer | G | 0 | 90 | 91 | 1.0 | 0.91 | 1.03 | | | | |
| | First polarizer | | | | | | | | | | | |
| Embodiment 13 | Second polarizer | | 0 | | | | | | 0.98 | 1.01 | 77 | 0.07 |
| | Second birefringent layer | NB | 0 | 75 | −38 | −0.5 | 1.00 | 1.00 | | | | |
| | VA liquid crystal cell | | | 0 | 320 | | 1.05 | 0.97 | | | | |
| | Third birefringent layer | NB | | 5 | 305 | | 1.00 | 1.00 | | | | |
| | First birefringent layer | G | 0 | 73 | 110 | 1.5 | 0.96 | 1.02 | | | | |
| | First polarizer | | 90 | | | | | | | | | |
| Embodiment 14 | Second polarizer | | 0 | | | | | | 0.98 | 1.01 | 76 | 0.07 |
| | Second birefringent layer | NB | 0 | 64 | −64 | −1.0 | 1.00 | 1.00 | | | | |
| | VA liquid crystal cell | | | 0 | 320 | | 1.05 | 0.87 | | | | |
| | Third birefringent layer | NB | | 5 | 305 | | 1.00 | 1.00 | | | | |
| | First birefringent layer | G | 0 | 64 | 128 | 2.0 | 0.96 | 0.96 | | | | |
| | First polarizer | | 90 | | | | | | | | | |
| Embodiment 15 | Second polarizer | | 0 | | | | | | 0.98 | 1.01 | 76 | 0.08 |
| | Second birefringent layer | NB | 0 | 53 | −95 | −1.8 | 1.00 | 1.00 | | | | |
| | VA liquid crystal cell | | | 0 | 320 | | 1.05 | 0.97 | | | | |
| | Third birefringent layer | NB | | 5 | 305 | | 1.00 | 1.00 | | | | |
| | First birefringent layer | G | 0 | 55 | 154 | 2.8 | 0.96 | 1.02 | | | | |
| | First polarizer | | 90 | | | | | | | | | |
| Embodiment 16 | Second polarizer | | 0 | | | | | | 0.98 | 1.01 | 75 | 0.08 |
| | Second birefringent layer | NB | 0 | 50 | −125 | −2.5 | 1.00 | 1.00 | | | | |
| | VA liquid crystal cell | | | 0 | 320 | | 1.05 | 0.97 | | | | |
| | Third birefringent layer | NB | | 5 | 305 | | 1.00 | 1.00 | | | | |
| | First birefringent layer | G | 0 | 50 | 175 | 3.5 | 0.96 | 1.02 | | | | |
| | First polarizer | | 90 | | | | | | | | | |

Comparative Embodiment 1

FIG. 2 is a perspective view that schematically shows the structure of the liquid crystal display device of Comparative Embodiment 1.

As shown in FIG. 2, the liquid crystal display device of Comparative Embodiment 1 is a VA liquid crystal display device 200j produced by stacking a TAC film 10j, a first polarizer 11j, a TAC film 20j, a VA liquid crystal cell 50j, a TAC film 30j, a second polarizer 12j, and a TAC film 40j, in this order. The VA liquid crystal cell 50j includes a back-side substrate 1j, a viewing-side substrate 2j, and liquid crystal molecules 3j which are disposed between the substrates and are aligned perpendicular to the surfaces of the substrates when no voltage is applied.

Table 8 shows the materials, optical characteristics, and axial designs of the birefringent films, the polarizers, and the liquid crystal cell of the present comparative embodiment.

Comparative Embodiment 2

FIG. 3 is a perspective view that schematically shows the structure of the liquid crystal display device of Comparative Embodiment 2.

As shown in FIG. 3, the liquid crystal display device of Comparative Embodiment 2 is a VA liquid crystal display device 200k produced by stacking a TAC film 10k, a first polarizer 11k, a biaxial retardation film 60k, a VA liquid crystal cell 50k, a TAC film 20k, a second polarizer 12k, and a TAC film 30k, in this order. The VA liquid crystal cell 50k includes a back-side substrate 1k, a viewing-side substrate 2k, and liquid crystal molecules 3k which are disposed between the substrates and are aligned perpendicular to the surfaces of the substrates when no voltage is applied.

Table 8 shows the materials, optical characteristics, and axial designs of the birefringent films, the polarizers, and the liquid crystal cell of the present comparative embodiment.

Comparative Embodiment 3

FIG. 4 is a perspective view that schematically shows the structure of the liquid crystal display device of Comparative Embodiment 3.

As shown in FIG. 4, the liquid crystal display device of Comparative Embodiment 3 is a VA liquid crystal display device 200m produced by stacking a TAC film 10m, a first polarizer 11m, a first biaxial retardation film 60m, a VA liquid crystal cell 50m, a second biaxial retardation film 61m, a second polarizer 12m, and a TAC film 20m, in this order. The VA liquid crystal cell 50m includes a back-side substrate 1m, a viewing-side substrate 2m, and liquid crystal molecules 3m which are disposed between the substrates and are aligned perpendicular to the surfaces of the substrates when no voltage is applied.

Table 8 shows the materials, optical characteristics, and axial designs of the birefringent films, the polarizers, and the liquid crystal cell of the present comparative embodiment.

TABLE 8

| | Optical components | Material | Angle [°] | |Rxy(550)| [nm] | Rxz(550) [nm] | Nz(550) | α | β | α' | β' | CR (45, 60) | ΔE (45, 60) |
|---|---|---|---|---|---|---|---|---|---|---|---|---|
| Comparative Embodiment 1 | Second polarizer | | 0 | | | | | | | | 20 | 0.10 |
| | TAC film | TAC | | 1 | 55 | | 0.81 | 1.11 | | | | |
| | VA liquid crystal cell | | | 0 | 320 | | 1.05 | 0.97 | | | | |
| | TAC film | TAC | | 1 | 55 | | 0.81 | 1.11 | | | | |
| | First polarizer | | 90 | | | | | | | | | |
| Comparative Embodiment 2 | Second polarizer | | 0 | | | | | | | | 70 | 0.22 |
| | TAC film | TAC | | 1 | 55 | | 0.81 | 1.11 | | | | |
| | VA liquid crystal cell | | | 0 | 320 | | 1.05 | 0.97 | | | | |
| | Biaxial retardation film | NB | 0 | 60 | 250 | | 1.00 | 1.00 | | | | |
| | First polarizer | | 90 | | | | | | | | | |
| Comparative Embodiment 3 | Second polarizer | | 0 | | | | | | | | 75 | 0.18 |
| | Biaxial retardation film | NB | 90 | 55 | 120 | | 1.00 | 1.00 | | | | |
| | VA liquid crystal cell | | | 0 | 320 | | 1.05 | 0.97 | | | | |
| | Biaxial retardation film | NB | 0 | 55 | 120 | | 1.00 | 1.00 | | | | |
| | First polarizer | | 90 | | | | | | | | | |

Reference Embodiment 1

FIG. 5 is a perspective view that schematically shows the structure of the liquid crystal display device of Reference Embodiment 1.

As shown in FIG. 5, the liquid crystal display device of Reference Embodiment 1 is a VA liquid crystal display device 200n produced by stacking a TAC film 10n, a first polarizer 11n, a negative C plate 23n, a VA liquid crystal cell 50n, a positive A plate 21n, a second polarizer 12n, and a TAC film 20n, in this order. The VA liquid crystal cell 50n includes a back-side substrate 1n, a viewing-side substrate 2n, and liquid crystal molecules 3n which are disposed between the substrates and are aligned perpendicular to the surfaces of the substrates when no voltage is applied.

Table 9 shows the materials, optical characteristics, and axial designs of the birefringent films, the polarizers, and the liquid crystal cell of the present reference embodiment.

Reference Embodiment 2

FIG. 6 is a perspective view that schematically shows the structure of the liquid crystal display device of Reference Embodiment 2.

As shown in FIG. 6, the liquid crystal display device of Reference Embodiment 2 is a VA liquid crystal display device 200p produced by stacking a TAC film 10p, a first polarizer 11p, a negative C plate 23p, a VA liquid crystal cell 50p, a positive C plate 25p, a positive A plate 21p, a second polarizer 12p, and a TAC film 20p, in this order. The VA liquid crystal cell 50p includes a back-side substrate 1p, a viewing-side substrate 2p, and liquid crystal molecules 3p which are disposed between the substrates and are aligned perpendicular to the surfaces of the substrates when no voltage is applied.

Table 9 shows the materials, optical characteristics, and axial designs of the birefringent films, the polarizers, and the liquid crystal cell of the present reference embodiment.

Reference Embodiment 3

FIG. 7 is a perspective view that schematically shows the structure of the liquid crystal display device of Reference Embodiment 3.

As shown in FIG. 7, the liquid crystal display device of Reference Embodiment 3 is a VA liquid crystal display device 200q produced by stacking a TAC film 10q, a first polarizer 11q, a negative C plate 23q, a VA liquid crystal cell 50q, three biaxial retardation films 60q to 62q, a second polarizer 12q, and a TAC film 20q, in this order. The VA liquid crystal cell 50q includes a back-side substrate 1q, a viewing-side substrate 2q, and liquid crystal molecules 3q which are disposed between the substrates and are aligned perpendicular to the surfaces of the substrates when no voltage is applied.

Table 9 shows the materials, optical characteristics, and axial designs of the birefringent films, the polarizers, and the liquid crystal cell of the present reference embodiment.

TABLE 9

| | Optical components | Material | Angle [°] | |Rxy(550)| [nm] | Rxz(550) [nm] | Nz(550) | α | β | α' | β' | CR (45, 60) | ΔE (45, 60) |
|---|---|---|---|---|---|---|---|---|---|---|---|---|
| Reference Embodiment 1 | Second polarizer | | 0 | | | | | | | | 75 | 0.03 |
| | Reverse dispersion A plate | G | 90 | 130 | 169 | 1.3 | 0.91 | 1.03 | | | | |
| | VA liquid crystal cell | | | 0 | 320 | | 1.05 | 0.97 | | | | |
| | Positive dispersion −C plate | ChLC | 0 | 5 | 180 | 36.0 | 1.03 | 0.99 | | | | |
| | First polarizer | | 90 | | | | | | | | | |
| Reference Embodiment 2 | Second polarizer | | 0 | | | | | | | | 77 | 0.03 |
| | Reverse dispersion A plate | G | 0 | 130 | 169 | 1.3 | 0.91 | 1.03 | | | | |
| | Reverse dispersion +C plate | G | 0 | 2 | 100 | 50.0 | | | | | | |
| | VA liquid crystal cell | | | 0 | 320 | | 1.05 | 0.97 | | | | |
| | Positive dispersion −C plate | ChLC | 0 | 0 | 310 | | 1.04 | 0.97 | | | | |
| | First polarizer | | | | | | | | | | | |
| Reference Embodiment 3 | Second polarizer | | 0 | | | | | | | | 80 | 0.02 |
| | Biaxial retardation film | G | 0 | 90 | 43 | 0.5 | 0.91 | 1.03 | | | | |
| | Biaxial retardation film | G | 0 | 90 | 43 | 0.5 | 0.91 | 1.03 | | | | |
| | Biaxial retardation film | G | 0 | 90 | 43 | 0.5 | 0.91 | 1.03 | | | | |

TABLE 9-continued

| Optical components | Material | Angle [°] | |Rxy(550)| [nm] | Rxz(550) [nm] | Nz(550) | α | β | α' | β' | CR (45, 60) | ΔE (45, 60) |
|---|---|---|---|---|---|---|---|---|---|---|---|
| VA liquid crystal cell | | | 0 | 320 | | 1.05 | 0.97 | | | | |
| Positive dispersion −C plate | ChLC | 0 | 0 | 310 | | 1.04 | 0.97 | | | | |
| First polarizer | | 90 | | | | | | | | | |

(Evaluation Results)

The viewing angle dependence of contrast and the viewing angle dependence of chromaticity in each embodiment were determined, and the CR (45, 60) and the ΔE (45, 60) were shown in Tables 4 to 9.

The liquid crystal display device in each of Embodiments 1 to 16 according to the present invention had a CR (45, 60) equivalent to or higher than that in each of Comparative Embodiments 1 to 3. Even in a visual observation, the liquid crystal display device in each of Embodiments 1 to 16 had viewing angle dependence of contrast equivalent to or higher than that in each of Comparative Embodiments 1 to 3.

In the liquid crystal display device in each of Embodiments 1 to 16 according to the present invention, the ΔE (45, 60) was lower than that in each of Comparative Embodiments 2 and 3 although the CR (45, 60) was similar to that therein. Even in a visual observation, a change in the viewing angle seemed to cause a small change in the chromaticity, and the liquid crystal display device in each of Embodiments 1 to 16 had a better viewing angle dependence of chromaticity than that in each of Comparative Embodiments 2 and 3.

The liquid crystal display device in each of Reference Embodiments 1 to 3 had a ΔE (45, 60) much lower than that of the liquid crystal display device in each of Embodiments 1 to 11 and 13 to 16 according to the present invention, and had a better viewing angle dependence of chromaticity than that thereof. However, these liquid crystal display devices each comprise a difficult-to-produce retardation film selected from a positive C plate, a biaxial retardation film with Nz≈0.5, and a retardation film with reverse wavelength dispersion having a retardation |Rxy(550)| of 118 nm or larger.

The liquid crystal display device in Embodiment 12 according to the present invention had a ΔE (45, 60) equal to or better than that of the liquid crystal display device in each of Reference Embodiments 1 to 3, and had viewing angle dependence of chromaticity equal to or better than that thereof even in visual observation. In other words, the liquid crystal display device in Embodiment 12 according to the present invention achieves much better viewing angle dependence of chromaticity than that in each of Comparative Embodiments 1 to 3 without any of the following difficult-to-produce retardation films, a positive C plate; a biaxial retardation film with Nz≈0.5; and a retardation film with reverse wavelength dispersion having a retardation |Rxy (550)| of 118 nm or larger.

The present application claims priority to Patent Application No. 2007-323936 filed in Japan on Dec. 14, 2007 under the Paris Convention and provisions of national law in a designated State. The entire contents of which are hereby incorporated by reference.

EXPLANATION OF SYMBOLS

Figure 1:
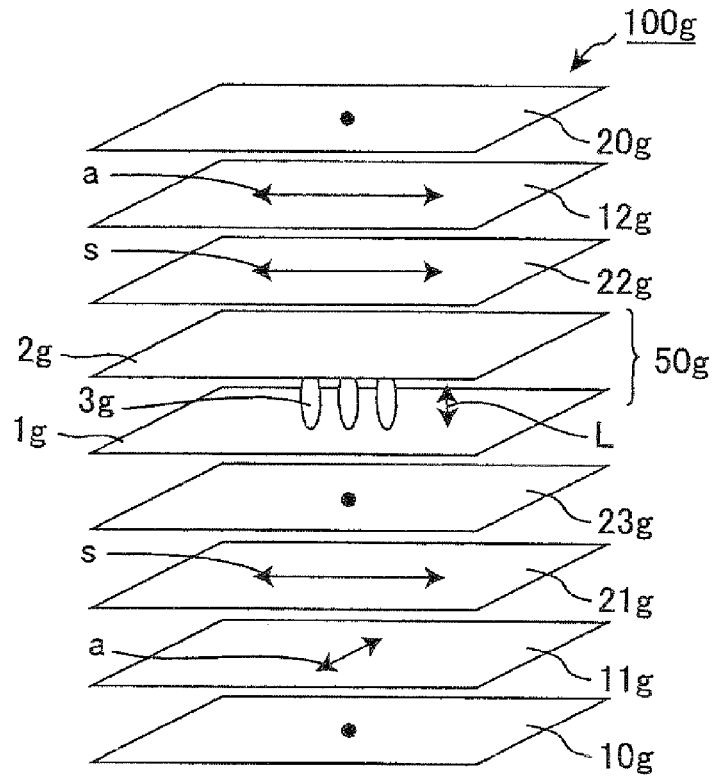
FIG. 1 is a perspective view that schematically shows the structure of the liquid crystal display device of Embodiment 1.
Figure 2:
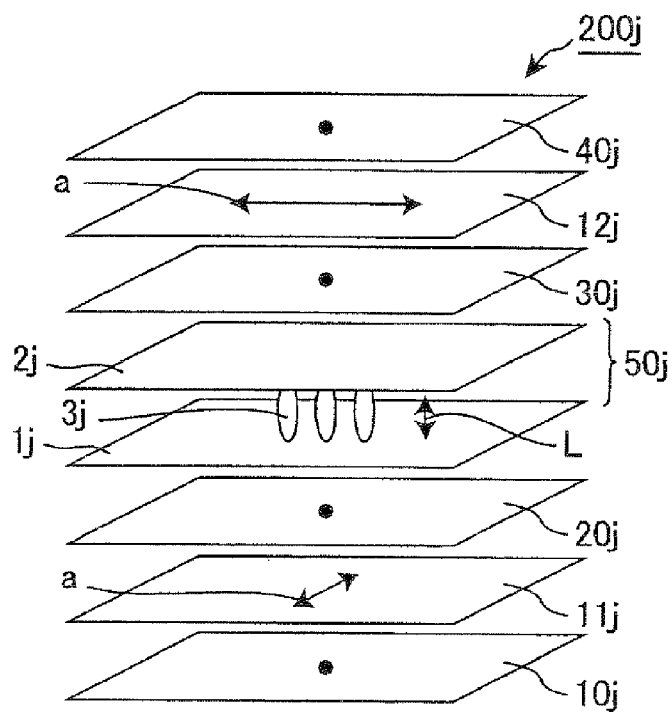
FIG. 2 is a perspective view that schematically shows the structure of the liquid crystal display device of Comparative Embodiment 1.
Figure 3:
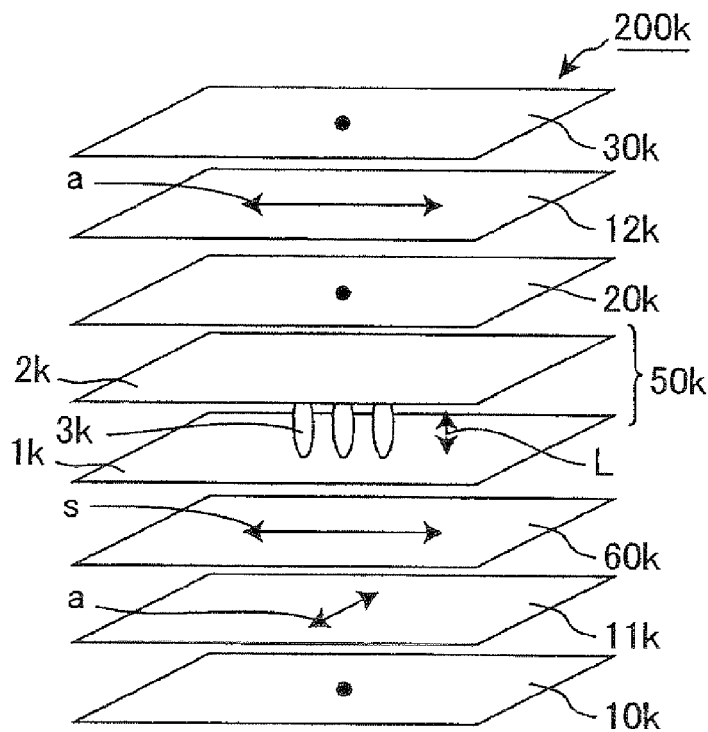
FIG. 3 is a perspective view that schematically shows the structure of the liquid crystal display device of Comparative Embodiment 2.
Figure 4:
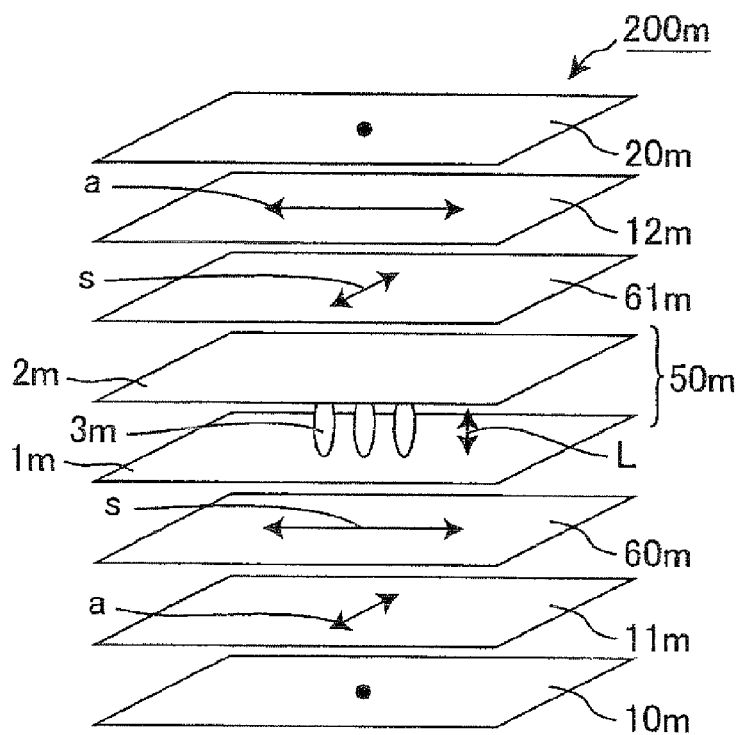
FIG. 4 is a perspective view that schematically shows the structure of the liquid crystal display device of Comparative Embodiment 3.
Figure 5:
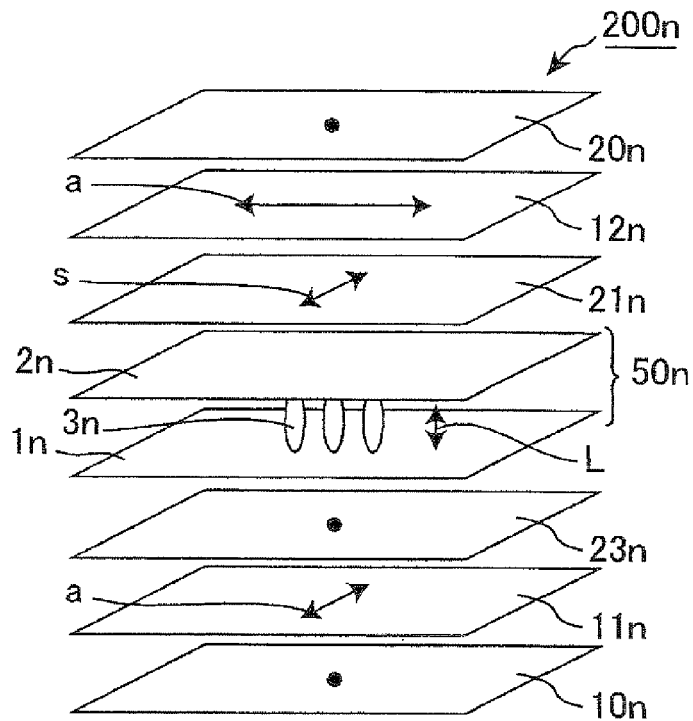
FIG. 5 is a perspective view that schematically shows the structure of the liquid crystal display device of Reference Embodiment 1.
Figure 6:
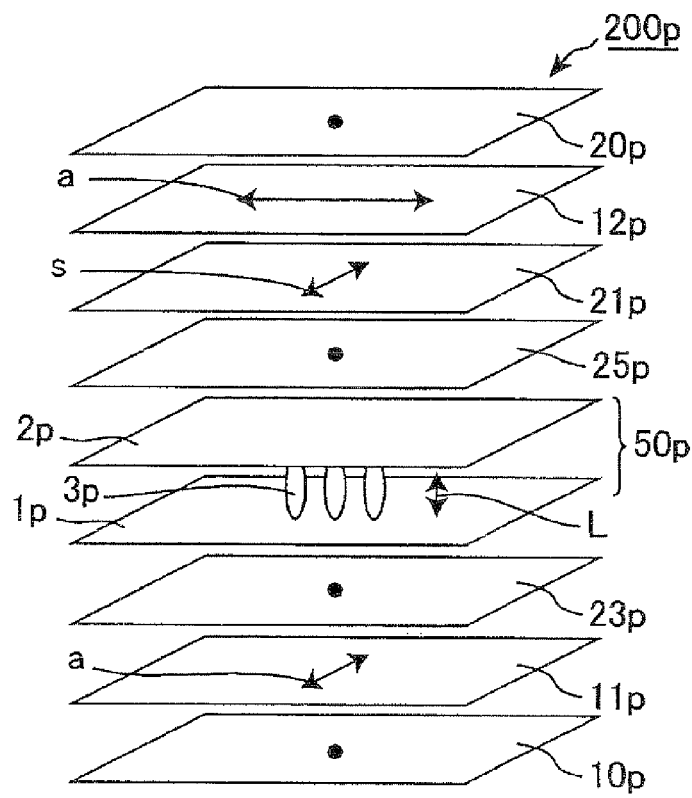
FIG. 6 is a perspective view that schematically shows the structure of the liquid crystal display device of Reference Embodiment 2.
Figure 7:
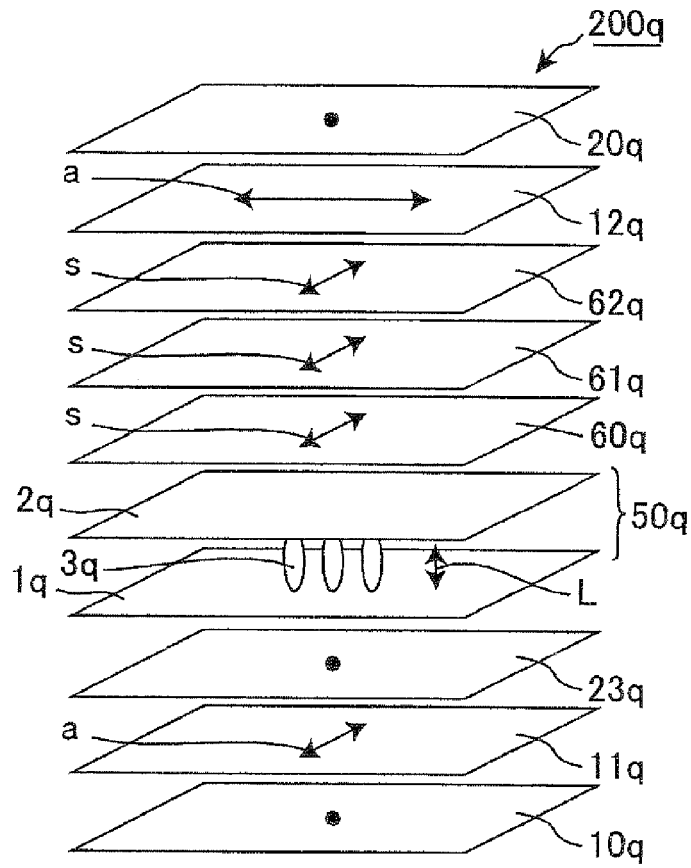
FIG. 7 is a perspective view that schematically shows the structure of the liquid crystal display device of Reference Embodiment 3.
Figure 8:
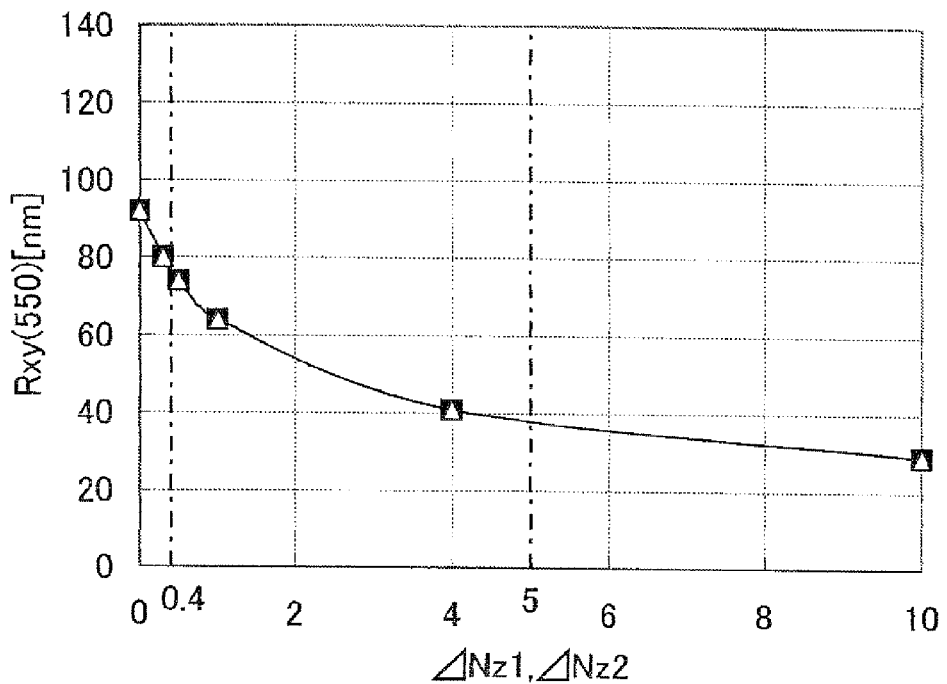
FIG. 8 is a graph that shows the relationship between ΔNz1, ΔNz2, and the optimum |Rxy(550)| in the case of satisfying ΔNz1=ΔNz2. "■" represents the first birefringent layer, and "Δ" represents the second birefringent layer.
Figure 9:
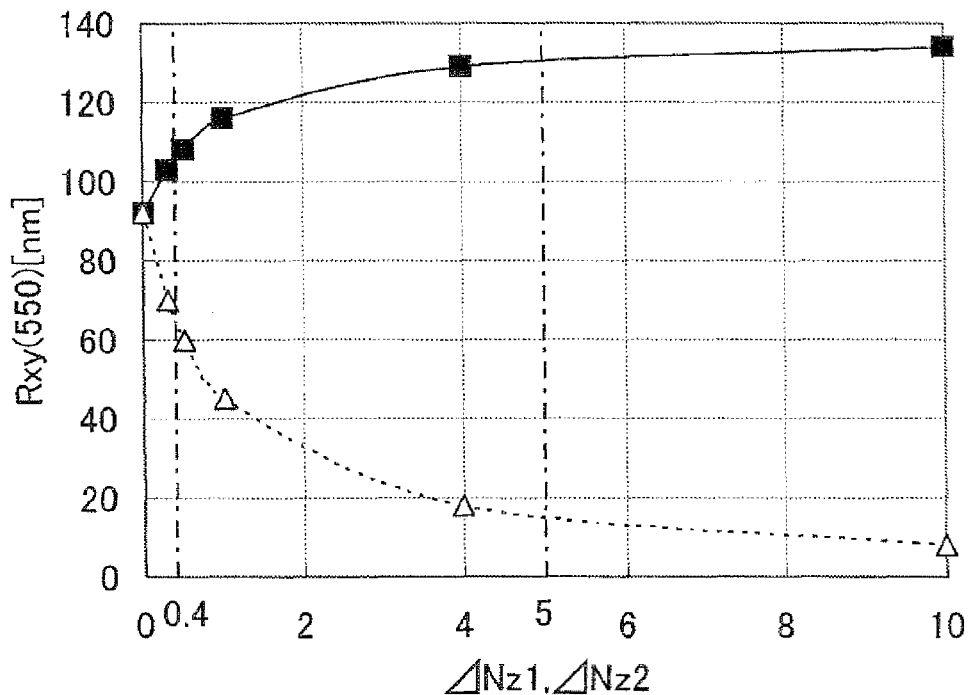
FIG. 9 is a graph that shows the relationship between ΔNz1, ΔNz2, and the optimum |Rxy(550)| in the case of satisfying ΔNz1<ΔNz2. "■" represents the first birefringent layer, and "Δ" represents the second birefringent layer.
Figure 10:
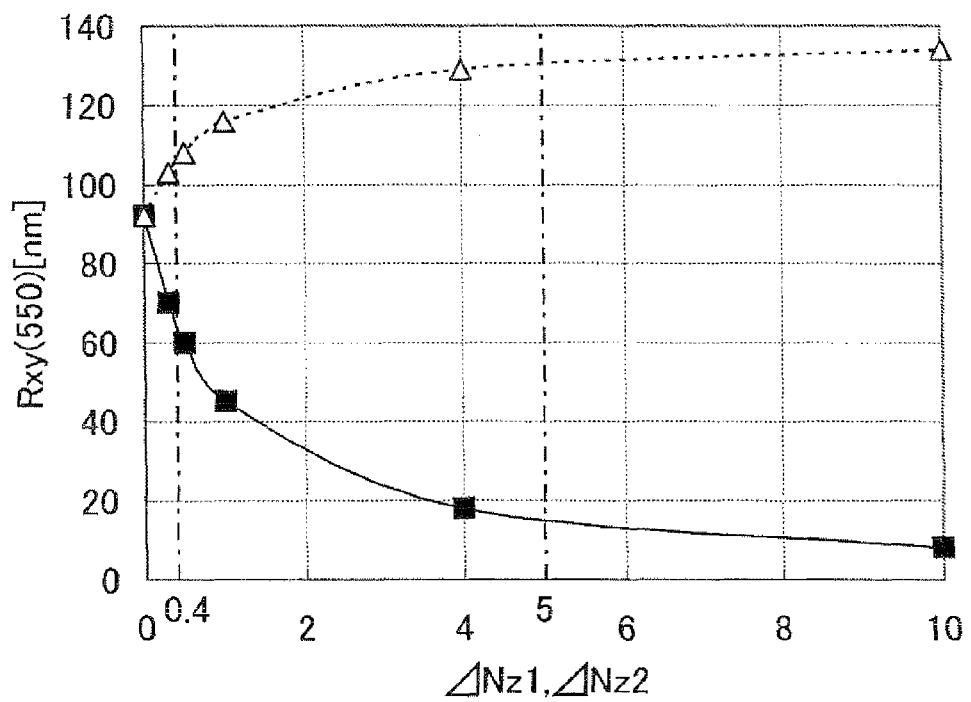
FIG. 10 is a graph that shows the relationship between ΔNz1, ΔNz2, and the optimum |Rxy(550)| in the case of satisfying ΔNz1>ΔNz2. "■" represents the first birefringent layer, and "Δ" represents the second birefringent layer.

1g, 1j to 1q: Back-side substrate
2g, 2j to 2q: Viewing-side substrate
3g, 3j to 3q: Liquid crystal molecule
10g, 10j to 10q, 20g, 20j to 20q, 30j, 30k, 40j: TAC film
11g, 11j to 11q: First polarizer
12g, 12j to 12q: Second polarizer
21g, 21j to 21i: First birefringent layer
21n, 21p: Positive A plate
22g: Second birefringent layer
23g, 23j to 23q: Third birefringent layer
25p: Positive C plate
50g, 50j to 50q: VA liquid crystal cell
60k to 60q, 61m to 61q, 62q: Biaxial retardation film
100g, 200j to 200q: VA liquid crystal display device
a: Absorption axis of polarizer
L: Longitudinal axis of liquid crystal molecule
s: Slow axis

The invention claimed is:
1. A liquid crystal display device, comprising:
a first polarizer;
a second polarizer;
a liquid crystal cell;
a first birefringent layer; and
a second birefringent layer, the second polarizer having an absorption axis orthogonal to an absorption axis of the first polarizer, the liquid crystal cell being disposed between the first polarizer and the second polarizer, the first birefringent layer being disposed between the first polarizer and the liquid crystal cell, satisfying $0.6 \leq Nz(550) \leq 6$, and having an in-plane slow axis orthogonal to the absorption axis of the first polarizer, the second birefringent layer being disposed between the liquid crystal cell and the second polarizer, satisfying $-5 \leq Nz(550) \leq 0.4$, and having an in-plane slow axis parallel to the absorption axis of the second polarizer, and at least one of the first and second birefringent layers satisfying $|Rxy(450)| \leq |Rxy(550)| \leq |Rxy(650)|$.

2. The liquid crystal display device according to claim 1, satisfying $0 \leq Nz'(550) \leq 1$ wherein $Nz'(550)$ represents an arithmetic mean between $Nz(550)$ of the first birefringent layer and $Nz(550)$ of the second birefringent layer.

3. The liquid crystal display device according to claim 2, satisfying $0.3 \leq Nz'(550) \leq 0.7$.

4. The liquid crystal display device according to claim 1, wherein at least one of the first and second birefringent layers satisfies $|Rxy(550)| \leq 130$ nm.

5. The liquid crystal display device according to claim 4, wherein the liquid crystal display device satisfies $\Delta Nz1 = \Delta Nz2$, wherein $\Delta Nz1$ represents a biaxial parameter of the first birefringent layer defined as $|Nz(550)-1|$, and $\Delta Nz2$ represents a biaxial parameter of the second birefringent layer defined as $|Nz(550)|$; and the first and second birefringent layers satisfy $35 \text{ nm} \leq |Rxy(550)| \leq 95$ nm.

6. The liquid crystal display device according to claim 4, wherein the liquid crystal display device satisfies $\Delta Nz1 < \Delta Nz2$, wherein $\Delta Nz1$ represents a biaxial parameter of the first birefringent layer defined as $|Nz(550)-1|$, and $\Delta Nz2$ represents a biaxial parameter of the second birefringent layer defined as $|Nz(550)|$;

the first birefringent layer satisfies $90 \text{ nm} \leq |Rxy(550)| \leq 130$ nm; and the second birefringent layer satisfies $15 \text{ nm} \leq |Rxy(550)| \leq 195$ nm.

7. The liquid crystal display device according to claim 4, wherein the liquid crystal display device satisfies $\Delta Nz1 > \Delta Nz2$, wherein $\Delta Nz1$ represents a biaxial parameter of the first birefringent layer defined as $|Nz(550)-1|$, and $\Delta Nz2$ represents a biaxial parameter of the second birefringent layer defined as $|Nz(550)|$;

the first birefringent layer satisfies $15 \text{ nm} \leq |Rxy(550)| \leq 195$ nm; and the second birefringent layer satisfies $90 \text{ nm} \leq |Rxy(550)| \leq 130$ nm.

8. The liquid crystal display device according to claim 1, satisfying $R'xy(450) \leq R'xy(550) \leq R'xy(650)$ wherein $R'xy(\lambda)$ represents an arithmetic mean between $|Rxy(\lambda)|$ of the first birefringent layer and $|Rxy(\lambda)|$ of the second birefringent layer.

9. The liquid crystal display device according to claim 1, wherein the second birefringent layer includes a material having negative intrinsic birefringence.

10. The liquid crystal display device according to claim 1, further comprising a third birefringent layer satisfying $10 \leq Nz(550) \leq \infty$, wherein the liquid crystal display device displays a black screen by aligning liquid crystal molecules in the liquid crystal cell perpendicular to a substrate surface; and the third birefringent layer is disposed between the first polarizer and the second polarizer.

11. The liquid crystal display device according to claim 10, wherein the third birefringent layer is disposed adjacent to the liquid crystal cell.

* * * * *